United States Patent [19]

Adachi et al.

[11] Patent Number: 5,526,270

[45] Date of Patent: Jun. 11, 1996

[54] APPARATUS FOR REMOVING OFF-SET FROM MEASURED QUANTITY

[75] Inventors: Kazutaka Adachi; Ken Itoh, both of Yokohama, Japan

[73] Assignee: Nissan Motor Co., Ltd., Yokohama, Japan

[21] Appl. No.: 351,737

[22] Filed: Dec. 8, 1994

Related U.S. Application Data

[63] Continuation of Ser. No. 697,995, May 10, 1991, abandoned.

[30] Foreign Application Priority Data

May 14, 1990 [JP] Japan ................... 2-123269

[51] Int. Cl.$^6$ ............................................. B62D 6/00
[52] U.S. Cl. .................. 364/424.05; 364/424.01; 180/446; 180/421
[58] Field of Search ............... 364/424.01, 424.05, 364/571.01; 180/79.1, 140, 141, 142, 143; 280/707

[56] References Cited

U.S. PATENT DOCUMENTS

| | | | |
|---|---|---|---|
| 4,666,013 | 5/1987 | Shibahata et al. | 180/141 |
| 4,856,607 | 8/1989 | Sueshige et al. | 180/142 |
| 4,961,474 | 10/1990 | Daido et al. | 180/79.1 |
| 5,001,636 | 3/1991 | Shiraishi et al. | 364/424.05 |
| 5,001,637 | 3/1991 | Shiraishi et al. | 364/424.05 |
| 5,018,594 | 5/1991 | Takahashi et al. | 180/140 |
| 5,040,629 | 8/1991 | Matsuoka et al. | 180/79.1 |
| 5,065,323 | 11/1991 | Shiraishi et al. | 364/424.05 |
| 5,122,955 | 6/1992 | Ishikawa et al. | 364/424.05 |
| 5,333,058 | 7/1994 | Shiraishi et al. | 364/424.05 |

*Primary Examiner*—Collin W. Park
*Attorney, Agent, or Firm*—Foley & Lardner

[57] ABSTRACT

An apparatus for removing an off-set from a measured quantity capable of obtaining an accurate information on the measured quantity by removing the off-set contained in the measured quantity. The apparatus includes a plurality of physical quantity detectors, each one for detecting a value of a different one of a plurality of physical quantities which are mutually related through an identical equation of motion; an off-set calculator for calculating, in a prescribed state in which a value of one of the physical quantities detected by one detector is known to be accurate, off-sets of values of remaining physical quantities obtained by remaining detectors in accordance with a value of aforementioned one of the physical quantities detected by aforementioned one detector; and an off-set remover for removing the off-sets calculated by the off-set calculator from values of aforementioned remaining physical quantities obtained by aforementioned remaining detectors.

12 Claims, 5 Drawing Sheets

APPARATUS FOR REMOVING OFF-SET FROM MEASURED QUANTITY

This application is a continuation of application Ser. No. 07/697,995, filed May 10, 1991, now abandoned.

BACKGROUND OF THE INVENTION

1. Field of the Invention

The present invention relates to an apparatus for removing an off-set from a measured quantity containing an off-set.

2. Description of the Background Art

As an example of a conventional apparatus for removing an off-set from a measured quantity containing an off-set, there is a steering angle detection apparatus disclosed in Japanese Patent Application Laid Open No. 62-77210.

In a case a steering angle of a steering mechanism is detected by using a conventionally known steering angle sensor, the information concerning the steering angle measured from a central position in the steering mechanism can be obtained, but the central position in the steering mechanism may not necessarily coincide with a straight running position at which the car can be kept running straight, so that the signal from the steering angle sensor contains an off-set in addition to the desired steering angle information in a form of the steering angle with respect to the straight running position.

For this reason, the steering angle detection apparatus of the reference mentioned above comprises: a steering angle sensor for detecting a steering angle in the steering mechanism; an approximate central position sensor for detecting an angle range for an approximate central position in the steering mechanism; a quasi-central position calculation means for calculating a quasi-central position $\theta_{CA}$ as a mean displacement of a steering angle sensor signal $\theta_0$ at a time of the approximate central position detection; and a steering angle calculation means for updating the central position $\theta_C$ by the quasi-central position $\theta_{CA}$ and for calculating a steering angle $\theta$ as a difference between the steering angle sensor signal $\theta_0$ and the central position $\theta_C$, such that it becomes possible to obtain the steering angle $\theta=\theta_0-\theta_C$ with respect to the straight running position at which the car can be kept running straight.

However, in this conventional steering angle detection apparatus, while the car is running, if the signal from the quasi-central position detection sensor remains in an ON state for more than a prescribed distance, the central position $\theta_C$ is updated by the quasi-central position $\theta_{CA}$ obtained from the mean displacement of the steering angle sensor signal $\theta_0$ from the steering angle sensor. Namely, in this conventional steering angle detection apparatus, the off-set is removed by using the quasi-central position sensor signal which, has the same physical dimension as the steering angle sensor signal $\theta_0$. As a result, in a case of running on a high-way with continuous cornering at large radii, the quasi-central position $\theta_{CA}$ obtained by the quasi-central position calculation means can be considerably displaced from the actual central position, so that the steering angle $\theta$ obtained by the steering angle calculation means ends up having an off-set corresponding to this displacement of the quasi-central position $\theta_{CA}$ which is used to update the central position $\theta_C$.

As a consequence, in a case of applying this conventional steering angle detection apparatus to a system for controlling dynamic characteristics of the car by using the steering angle $\theta$ as an input information, the controlling becomes such that the-desired dynamic characteristics of the car is not obtainable, due to the off-set contained in the steering angle information in addition to the actual value.

More specifically, in a case such a conventional steering angle detection apparatus is applied to a brake control system disclosed in Japanese Patent Application Laid Open No. 3-70663 by the present inventor, in which a steering angle and a yaw rate are entered as an input information, a target yaw rate appropriate for the steering angle is calculated, and the brake of each wheel is controlled as the signal is outputted to a brake actuator such that the input yaw rate and the target yaw rate coincide, the off-set for the steering angle $\theta$ to be given as an input information for obtaining the target yaw rate causes an unnecessary brake control in a non-cornering situation and an insufficient yaw rate characteristic in a curving situation.

SUMMARY OF THE INVENTION

It is therefore an object of the present invention to provide an apparatus for removing an off-set from a measured quantity capable of obtaining an accurate information on the measured quantity by removing the off-set contained in the measured quantity.

According to one aspect of the present invention there is provided an off-set removing apparatus, comprising: a plurality of physical quantity detection means, each one for detecting a value of a different one of a plurality of physical quantities which are mutually related through an identical equation of motion; off-set calculation means for calculating, in a prescribed state in which a value of one of the physical quantities detected by one detection means is known to be accurate, off-sets of values of remaining physical quantities obtained by remaining detection means in accordance with a value of said one of the physical quantities detected by said one detection means; and off-set removal means for removing the off-sets calculated by the off-set calculation means from values of said remaining physical quantities obtained by said remaining detection means.

According to another aspect of the present invention there is provided an off-set removing apparatus for a dynamic characteristic control system of an automobile, comprising: input detection means for detecting a value of a system input representing a dynamic characteristic of the automobile; state detection means for detecting a state of the automobile; off-set calculation means for calculating, in a prescribed state of the automobile detected by the state detection means, an off-set of the system input obtained by the input detection means in accordance with the state detected by the state detection means, and for updating system parameters expressing the state of the automobile according to the calculated off-set; and off-set removal means for removing the off-sets calculated by the off-set calculation means from the system input obtained by the input detection means.

Other features and advantages of the present invention will become apparent from the following description taken in conjunction with the accompanying drawings.

DETAILED DESCRIPTION OF THE PREFERRED EMBODIMENTS

Figure 1:
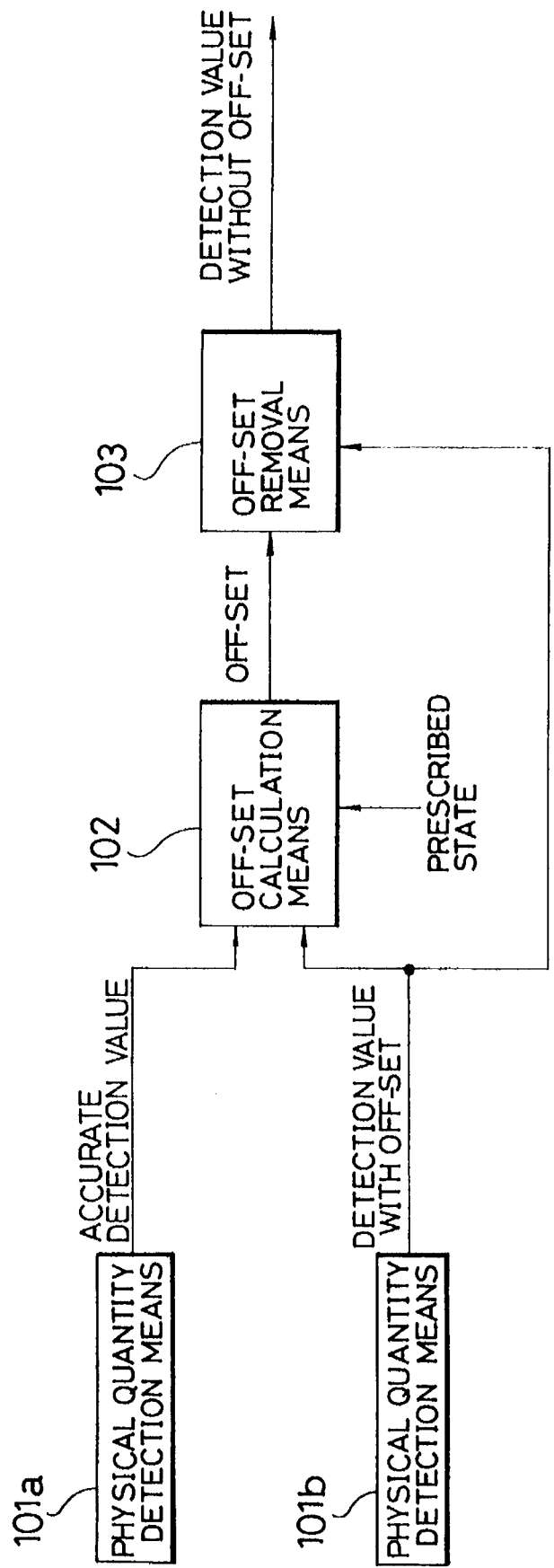
FIG. 1 is a general block diagram of a conceptual outline of an off-set removing apparatus according to the present invention.

Referring now to FIG. 1, the fundamentals of the off-set removing apparatus according to the present invention will be described.

According to the present invention, the apparatus incorporates a plurality of physical quantity detection means, each one for detecting a value of a different one of a plurality of physical quantities which are mutually related through the identical equation of motion, such that when a detection value of one physical quantity detected by one detection means is known to be accurate, the off-sets in the detection values of the other related physical quantities detected by the other detection means can be obtained in accordance with the accurate detection value detected by said one detection means and the resulting off-sets of the detection values detected by the other detection means can subsequently be removed from these detection values.

Namely, as shown in FIG. 1, the apparatus generally comprises: a plurality (two in FIG. 1) of physical quantity detection means 101a and 101b, each one for detecting a value of a different one of a plurality of physical quantities which are mutually related through the identical equation of motion; an off-set calculation means 102 for calculating, in a prescribed state in which one of the physical quantity detected by one detection means is known to be accurate, the off-sets of the other physical quantities obtained by the other detection means in accordance with the accurate detection value detected by said one detection means; and an off-set removal means 103 for removing the off-sets calculated by the off-set calculation means from the detection values for said other physical quantities.

Thus, unlike the conventional off-set removal procedure according to the comparison of different detection values for the same physical quantity, the apparatus of the present invention performs the off-set removal procedure according to the comparison of detection values for different physical quantities related through the identical equation of motion. As a result, it becomes possible to avoid a conventionally problematic situation in which the different detection values of the same physical quantity have the same off-set simultaneously such that this common off-set is completely overlooked in the comparison of different detection values for the same physical quantity.

Figure 2:
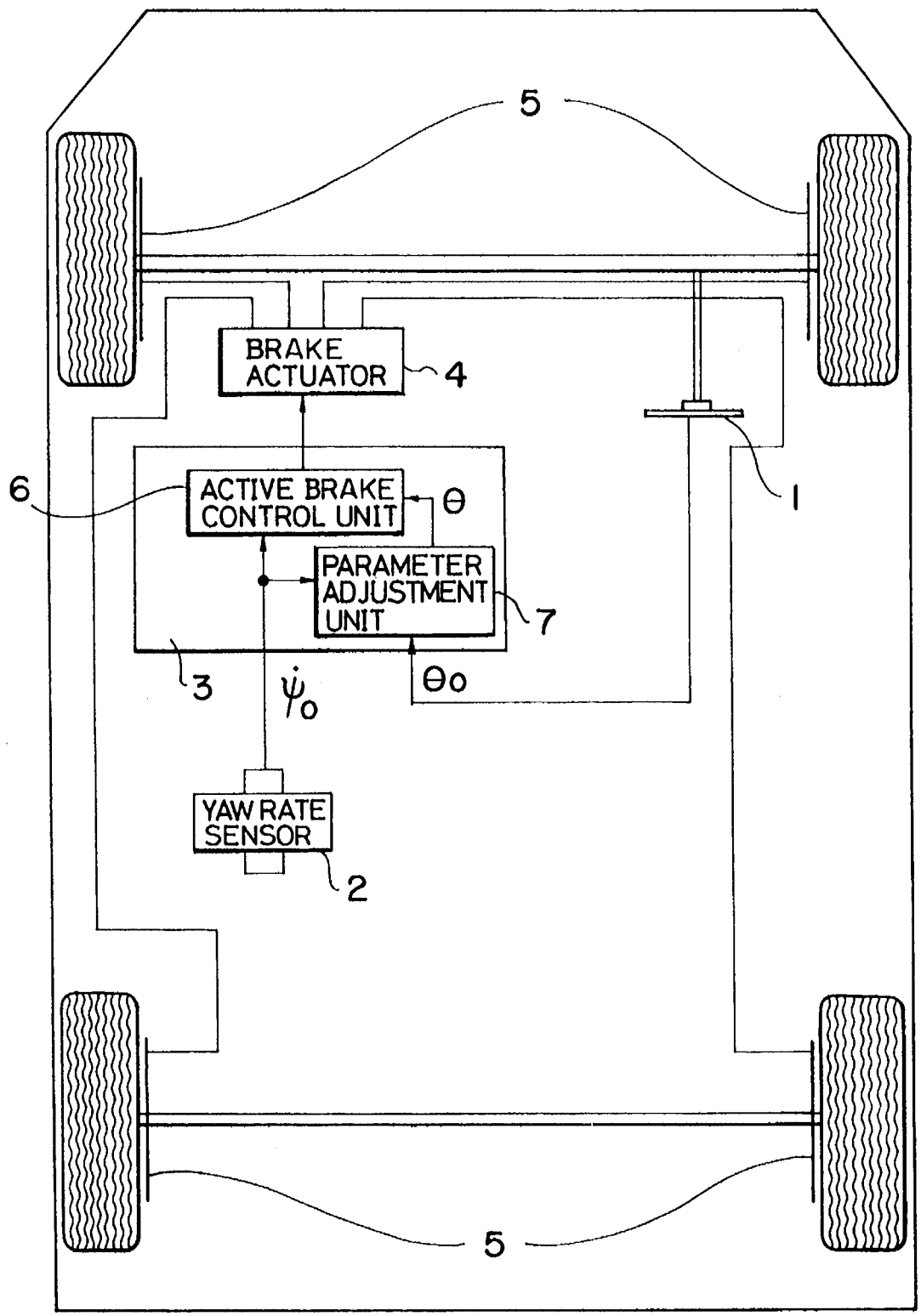
FIG. 2 is a schematic block diagram of one embodiment of an off-set removing apparatus according to the present invention.

Referring now to FIG. 2, one specific embodiment of the off-set removing apparatus according to the present invention will be described in detail.

This embodiment of the off-set removing apparatus is for a brake control system in a car, and comprises: a steering angle sensor 1 for detecting a steering angle of a steering wheel of the car; a yaw rate sensor 2 for detecting a yaw rate of a car while the car is running; a brake controller 3; and a brake actuator 4 for actuating brakes 5 associated with wheels of the car. The brake controller 3 includes: a parameter-adjustment unit 7 for obtaining an accurate steering angle $\theta$ from a steering angle sensor signal $\theta_0$ from the steering angle sensor 1 and a yaw rate sensor signal $\psi_0$ from the yaw rate sensor 2 by removing an off-set $\Delta u$ from a central position $\theta_C$ obtained from the steering angle sensor signal $\theta_0$, and calculating parameters $\eta(k)$ and $\hat{\eta}(k)$ of the system according to a parameter identification method to be described below; and an active brake control unit 6 for controlling the brake actuator 4 with a driving control signal in order to equalize the yaw rate sensor signal $\psi_0$ from the yaw rate sensor 2 to a target yaw rate $\psi^*$ calculated from the accurate steering angle $\theta$. Here, for example, the target yaw rate is obtained as a linear delay of the accurate steering angle $\theta$ given by:

$$\dot{\psi}^* = \frac{1}{1+Ts} \theta$$

where Ts is a delay constant.

This brake control system is a system utilizing a planar motion car model accounting for two degrees of freedom representing the yaw rate of the car, in which the steering angle sensor signal $\theta_0$ from the steering angle sensor 1 and a yaw rate sensor signal $\psi_0$ from the yaw rate sensor 2 are taken as inputs for calculating the target yaw rate $\psi^*$ as a yaw rate appropriate for the accurate steering angle $\theta$, and the brake actuator 4 is controlled by the driving control signal from the brake controller 3 such that the brakes 5 are controlled by the brake actuator 4 to make the yaw rate sensor signal $\psi_0$ and the target yaw rate $\psi^*$ equal to each other.

The parameter adjustment unit 7 receives the steering angle sensor signal $\theta_0$ from the steering angle sensor 1 and a yaw rate sensor signal $\theta_0$ from the yaw rate sensor 2 as inputs, where the steering angle and the yaw rate are two distinct physical quantities which are related through the identical equation of motion. From these inputs, in a prescribed state of straight running in which the yaw rate sensor signal $\psi_0$ is known to be accurately equal to zero, the parameter adjustment unit 7 calculates the off-set $\Delta u$ of the central position $\theta_C$ obtained from the steering angle sensor signal $\theta_0$, with respect to the accurately known yaw rate sensor signal $\psi_0$, such that the off-set $\Delta u$ can be removed from the central position $\theta_C$ and at the same time the parameters $\eta(k)$ and $\hat{\eta}(k)$ of the system can be calculated according to the parameter identification method to be described below.

Now, the procedure for calculating the off-set $\Delta u$ of the central position $\theta_C$ and the parameters $\eta(k)$ and $\hat{\eta}(k)$ of the system by using the parameter identification method will be described in detail.

First, an equation of motion of the car is expressed in terms of the planar motion car model as the following equation (1).

$$\dot{x} = Ax + Bu \qquad (1)$$

where $$A = \begin{pmatrix} 2a_{11}/V & 2a_{12}/V \\ 2a_{21}/V - V & 2a_{22}/V \end{pmatrix} \quad B = \begin{pmatrix} 2b_{11}/N \\ 2b_{21}/N \end{pmatrix}$$

$$a_{11} = -(L_F^2 \cdot K_F + L_R^2 \cdot K_R)/I_Z$$

$$a_{12} = -(L_F \cdot K_F - L_R \cdot K_R)/I_Z$$

$$a_{21} = -(L_F \cdot K_F - L_R \cdot K_R)/M$$

$$a_{22} = -(K_F + K_R)/M$$

$$b_{11} = L_F \cdot K_F / I_Z$$

$b_{21}=K_F/M$ $x^T=[\psi V_y]$ $u=\theta_0$ in which V is a speed of the car, N is a steering gear ratio, $L_F$ is a distance from front wheels to the center of gravity, $L_R$ is a distance from rear wheels to the center of gravity, $K_F$ is an equivalent front wheel cornering power, $K_R$ is a rear wheel cornering power, $I_z$ is a yaw moment of inertia, M is a mass of the car, and $V_y$ is a lateral speed of the car.

Choosing the yaw rate as an output, the output equation can be expressed as the following equation (2).

$$\psi=[1\ 0]x \qquad (2)$$

By using a differential operator $S=(d/dt)$, the above equations (1) and (2) can be re-expressed as the following equation (3).

$$A_P(S)\cdot\psi=B_F(S)\cdot u \qquad (3)$$

where $$\begin{aligned}A_P(S) &= S^2-(a_{11}+a_{22})(2/V)\cdot S + \\ &\quad (a_{11}\cdot a_{22}-a_{12}\cdot a_{21})\cdot(2/V)^2+2a_{12}\\ &= S^2+a_{y1}\cdot S+a_{y2}\\ B_F(S) &= b_{11}(2/N)\cdot S+(-a_{22}\cdot b_{11}+a_{12}\cdot b_{21})(4/V\cdot N)\\ &= b_{y1}\cdot S/N+b_{y0}/N\end{aligned}$$

Introducing a stable polynomial $F(S)$ of degree 2 given by the following equation (4):

$$F(S)=S^2+(f_0+g_0)\cdot S+f_0\cdot g_0 \qquad (4)$$

where $f_0$ and $g_0$ are constants which can stabilize the equation (4), the above equation (3) can be re-expressed as the following equation (5):

$$\frac{A_P(S)}{F(S)}\psi=\frac{B_F(S)}{F(S)}u \qquad (5)$$

and by transforming the above equation (5), the following equation (6) can be obtained.

$$\psi-\frac{(f_0+g_0)\cdot S+f_0\cdot g_0}{F(S)}\psi=\frac{1}{F(S)}\{-a_{y1}\cdot S\cdot\psi-a_{y2}\cdot\psi+b_{y1}\cdot S\cdot u/N+b_{y0}\cdot u/N\} \qquad (6)$$

This equation (6) can be re-written as the following equation (7).

$$\eta=\theta^T\cdot\xi \qquad (7)$$

where $\eta=\psi-\{(f_0+g_0)\cdot S\cdot F(S)^{-1}+f_0\cdot g_0\cdot F(S)^{-1}\}\cdot\psi$ $\theta^T=[a_{y1} a_{y2} b_{y1} b_{y0}]$ $\xi^T = [-S\cdot F(S)^{-1}\cdot\psi\ \ -F(S)^{-1}\cdot\psi\ \ S\cdot F(S)^{-1}\cdot u/N\ \ F(S)^{-1}\cdot u/N]$ Actually, the input u has the off-set $\Delta u$, so that the above equation (7) should be expressed as the following equation (8).

$$\eta=a_{y1}\cdot S\cdot F(S)^{-1}\cdot\psi-a_{y2}\cdot F(S)^{-1}\cdot\psi+b_{y1}\cdot S\cdot F(S)^{-1}\cdot(u+\Delta u)/N+b_{y0}\cdot F(S)^{-1}\cdot(u+\Delta u)/N \qquad (8)$$

Putting that $\Delta u$=const., it follows that:

$$S\cdot F(S)\cdot\Delta u/N=0 \qquad (9)$$

so that the above equation (8) can be re-written as the following equation (10).

$$\eta=\theta'^T\cdot\xi' \qquad (10)$$

where $\theta'^T=[a_{y1} a_{y2} b_{y1} b_{y0} b_{y0}\cdot\Delta u/N]$ $\xi'^T = [-S\cdot F(S)^{-1}\cdot\psi\ \ -F(S)^{-1}\cdot\psi\ \ S\cdot F(S)^{-1}\cdot u\ \ F(S)^{-1}\cdot u\ \ F(S)^{-1}]$ In correspondence with the above equation (10), an identifier expressed by the following equation (11) is set up. In the following, a symbol with ^ denotes an estimated value for the quantity represented by each symbol.

$$\hat{\eta}=\hat{\theta}'^T\cdot\xi' \qquad (11)$$

where $\hat{\theta}'^T=[\hat{a}_{y1}\hat{a}_{y2}\hat{b}_{y1}\hat{b}_{y0}\hat{b}_{y0}\cdot\Delta\hat{u}/N]$ Taking $\Delta T$ as a sampling time, the above equations (10) and (11) at a time $t=k\cdot\Delta T$ (k=0, 1, 2, ...) can be expressed as the following equations (12) and (13).

$$\eta(k)=\theta'^T(k)\cdot\xi'(k) \qquad (12)$$

$$\hat{\eta}(k)=\hat{\theta}'^T(k)\cdot\xi'(k) \qquad (13)$$

Here, an identification method is chosen to be the least square method as the following equations (14), (15), and (16), although it is not necessary to limit to this choice so that the other identification method can be chosen instead.

$$\hat{\theta}'(k+1)=\hat{\theta}'(k)+\frac{\beta(k)\cdot\Gamma(k)\cdot\xi(k)^T\cdot\epsilon(k)}{\sigma+\xi(k)^T\cdot\Gamma(k)\cdot\xi(k)} \qquad (14)$$

$$\Gamma(k+1)=\Gamma(k)+\frac{\beta(k)\cdot\Gamma(k)\cdot\xi(k)\cdot\xi(k)^T\cdot\Gamma(k)}{1+\xi(k)^T\cdot\Gamma(k)\cdot\xi(k)} \qquad (15)$$

$$\epsilon(k)=\eta(k)-\hat{\eta}(k) \qquad (16)$$

where $\Gamma(0)=\Gamma(0)^T>0,\ 0\leq\beta(k)<2$ in which $\beta(k)$ and $\sigma$ are weight coefficients.

Thus, it can be seen that the off-set $\Delta u$ arising at the steering angle sensor 1 for determining the central position $\theta_C$ can be obtained accurately by using the above described parameter identification method.

Figure 3:
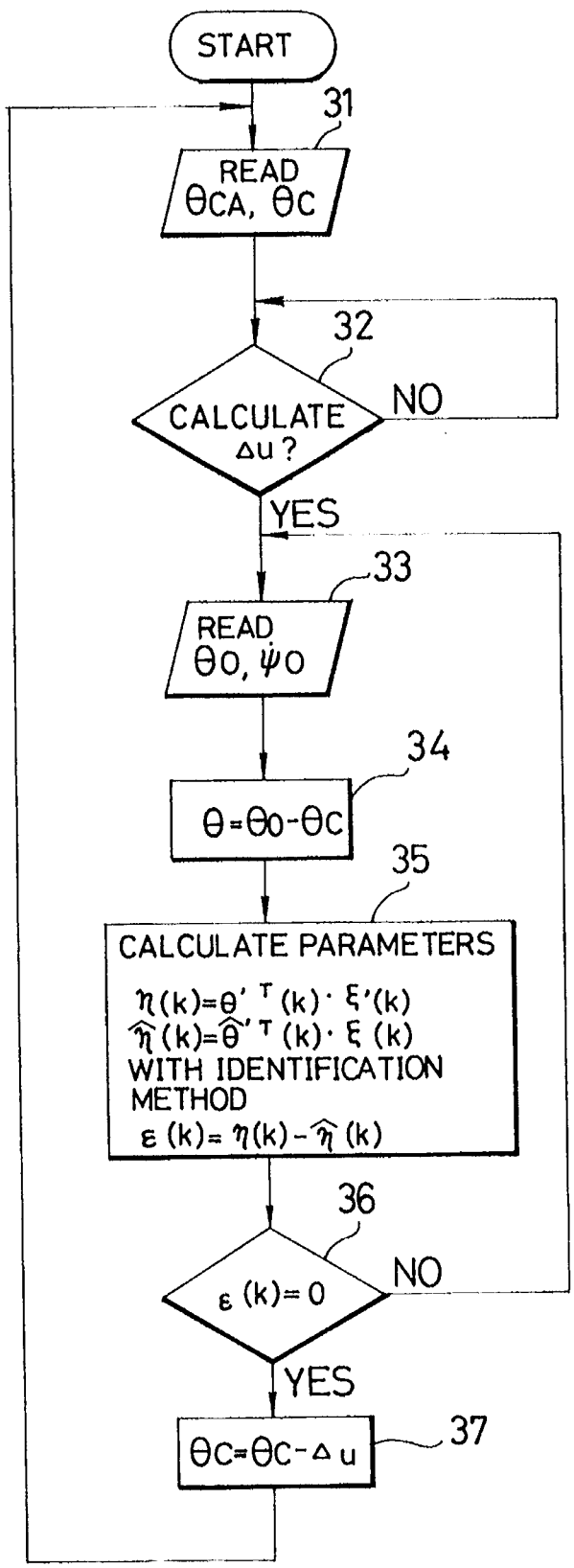
FIG. 3 is a flow chart for the operation of the off-set removing apparatus of FIG. 2.

The procedure for calculating the off-set $\Delta u$ of the central position $\theta_C$, the parameters $\eta(k)$ and $\hat{\eta}(k)$ of the system described above is actually carried out in the off-set removing apparatus of FIG. 2 according to the flow chart of FIG. 3 as follows.

First, at the step 31, a quasi-central position $\theta_{CA}$ as a mean displacement of the steering angle sensor signal $\theta_0$ at a time of the approximate central position detection and the central position $\theta_C$, obtained by the conventional procedure, are read out.

Then, at the step 32, whether the off-set Δu is to be calculated or not is judged according to whether the yaw rate sensor signal $\psi_0$ is zero or not in the straight running situation. Only when the yaw rate sensor signal $\psi_0$ is zero in the straight running situation, the process proceeds to the following steps.

At the step 33, the steering angle sensor signal $\theta_0$ from the steering angle sensor 1 and the yaw rate sensor signal $\psi_0$ from the yaw rate sensor 2 are read out.

Then, at the step 34, the steering angle θ is calculated by subtracting the central position $\theta_C$ from the steering angle sensor signal $\theta_0$.

Next, at the step 35, the parameters η(k) and $\hat{\eta}(k)$ expressed by the above equations (12) and (13) are calculated by using the parameter identification method expressed by the above equation (16).

Then, at the step 36, whether η(k) and $\hat{\eta}(k)$ are equal or not, i.e., the error ε(k) is equal to zero or not, is judged.

When the error ε(k) is not equal to zero, the parameter calculation at the steps 33 to 35 are repeated until the error ε(k) becomes equal to zero, at which point the process proceeds to the step 37.

At the step 37, the central position is updated by removing the off-set Δu from the old central position as $\theta_C^{new} = \theta_C^{old} - \Delta u$, where the off-set Δu has been calculated by using the steering angle sensor signal $\theta_0$ at a time the yaw rate sensor signal $\psi_0$ has been zero.

Figure 4:
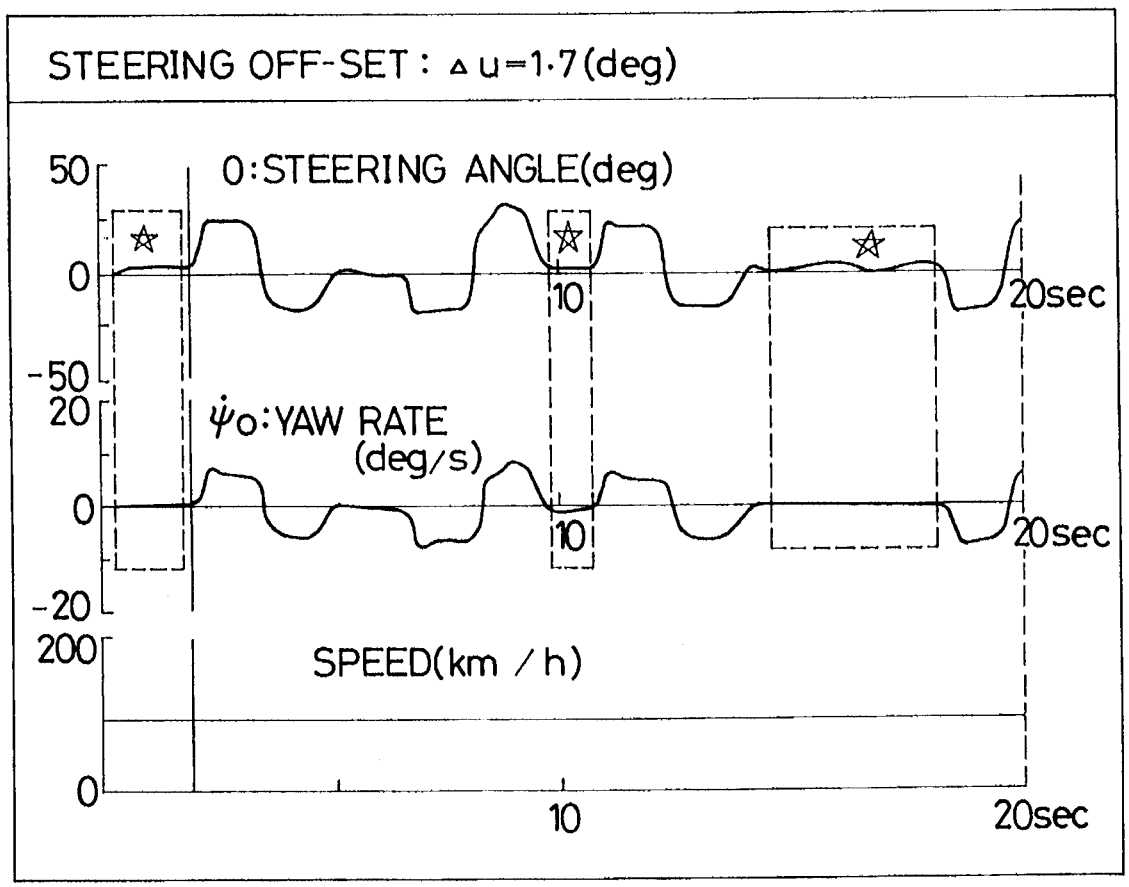
FIG. 4 is a graph of steering angle, yaw rate, and speed obtained without using the off-set removing apparatus of FIG. 2.
Figure 5:
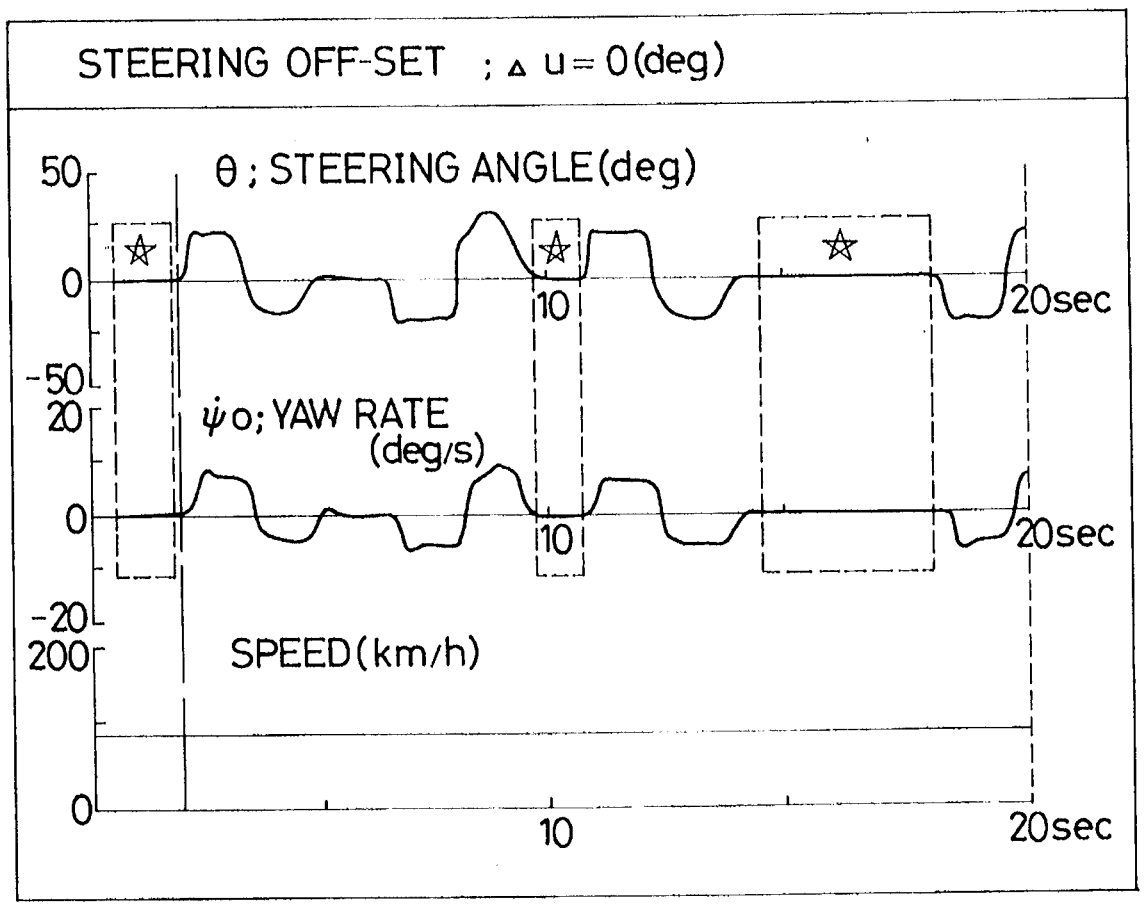
FIG. 5 is a graph of steering angle, yaw rate, and speed obtained by using the off-set removing apparatus of FIG. 2.

The effect of this embodiment can be seen by comparing the graphs of FIG. 4 and FIG. 5 obtained by the present inventor in the test conducted in the high speed running situation, where FIG. 4 represents the test result for the steering angle, yaw rate, and speed obtained without using the off-set removal apparatus of FIG. 2 for which the off-set is 1.7 (deg), while FIG. 5 represents the test result for the steering angle, yaw rate, and speed obtained by using the off-set removal apparatus of FIG. 2, for which the off-set is 0 (deg). In FIG. 4, the regions enclosed by dashed lines and marked by asterisks clearly show that the steering angle is not zero even when the yaw rate is zero, so that the central position $\theta_C$ has an off-set. On the other hand, in FIG. 5, the regions enclosed by dashed lines and marked by asterisks clearly show that the steering angle is almost always zero whenever the yaw rate is zero, so that the central position $\theta_C$ is free from the influence of the off-set.

As described, according to this embodiment, the off-set to be removed from the central position $\theta_C$ is calculated according to the steering angle sensor signal $\theta_0$ at a time the yaw rate sensor signal $\psi_0$ is zero, where the steering angle sensor signal $\theta_0$ and the yaw rate sensor signal $\psi_0$ represent two physical quantities related through the identical equation of motion. As a result, it becomes possible to obtain the accurate central position with respect to the straight running situation, without an influence of the off-set, even in a continuously cornering situation.

The above embodiment is suitable in a case the highly accurate yaw rate sensor is used. However, in a case a cheap yaw rate sensor having a problem of a drift of the zero point according to the temperature is to be used, the off-set Δu of about 2 to 3% arising in the steering angle θ obtained from the steering angle sensor signal is relatively unimportant compared with the off-set Δψ caused by the zero point drift of the yaw rate sensor. In such a case, the off-set removal apparatus of the present invention may be modified such that the steering angle θ obtained from the steering angle sensor signal can be taken as accurate, and the off-set Δψ can be removed from the yaw rate sensor signal, as follows.

Namely, in this case, the equation (5) described above is replaced by the following equation (17):

$$\frac{A_P(S)}{F(S)} (\acute{\psi} + \Delta\acute{\psi}) = \frac{B_F(S)}{F(S)} u \quad (17)$$

and by transforming this equation (17), the following equation (18) can be obtained.

$$\frac{S^2(\acute{\psi}+\Delta\acute{\psi})}{F(S)} = -a_{y1} \cdot \frac{S}{F(S)} \cdot (\acute{\psi}+\Delta\acute{\psi}) - a_{y2} \cdot \frac{1}{F(S)} \cdot \quad (18)$$
$$(\acute{\psi}+\Delta\acute{\psi}) + b_{y1} \cdot \frac{S}{F(S)} \cdot \frac{u}{N} + b_{y0} \cdot \frac{1}{F(S)} \cdot \frac{u}{N}$$

Putting that Δψ=const., it follows that:

$$S^2 \cdot \Delta\psi = 0$$

and $$S \cdot \Delta\psi = 0$$

so that the above equation (18) becomes the following equation (19).

$$\frac{S^2 \acute{\psi}}{F(S)} = -a_{y1} \cdot \frac{S}{F(S)} \cdot \acute{\psi} - a_{y2} \cdot \frac{1}{F(S)} \cdot \quad (19)$$
$$(\acute{\psi}+\Delta\acute{\psi}) + b_{y1} \cdot \frac{S}{F(S)} \cdot \frac{u}{N} + b_{y0} \cdot \frac{1}{F(S)} \cdot \frac{u}{N}$$

The above equation (19) can be re-written as the following equation (20).

$$\eta = \theta^T \cdot \epsilon \quad (20)$$

where $$\eta = \psi - \{(f_0+g_0) \cdot S \cdot F(S)^{-1} + f_0 \cdot g_0 \cdot F(S)^{-1}\} \cdot \psi$$

$$\theta^T = [a_{y1} a_{y2} b_{y1} b_{y0} a_{y2} \cdot \Delta\psi]$$

$$\xi^T = [-S \cdot F(S)^{-1} \cdot \acute{\psi} \quad -F(S)^{-1} \cdot \acute{\psi}$$
$$S \cdot F(S)^{-1} \cdot u/N \quad F(S)^{-1} \cdot u/N \quad F(S)^{-1}]$$

In correspondence with the above equation (20), an identifier expressed by the following equation (21) is set up.

$$\hat{\eta} = \hat{\theta}^T \cdot \epsilon \quad (21)$$

where $$\hat{\theta}^T = [\hat{a}_{y1} \hat{a}_{y2} \hat{b}_{y1} \hat{b}_{y0} \hat{a}_{y2} \cdot \Delta\hat{\psi}]$$

Taking ΔT as a sampling time, the above equations (20) and (21) at a time t=k·ΔT (k=0, 1, 2, ...) can be expressed as the following equations (22) and (23).

$$\eta(k) = \theta^T(k) \cdot \epsilon(k) \quad (22)$$

$$\hat{\eta}(k) = \hat{\theta}^T(k) \cdot \epsilon(k) \quad (23)$$

Here, an identification method is chosen to be the least square method as the following equations (24), (25), and (26), although it is not necessary to limit to this choice so that the other identification method can be chosen instead.

$$\hat{\theta}(k+1) = \hat{\theta}(k) + \frac{\beta(k) \cdot \Gamma(k) \cdot \xi(k)^T \cdot \epsilon(k)}{\sigma + \xi(k)^T \cdot \Gamma(k) \cdot \xi(k)} \quad (24)$$

$$\Gamma(k+1) = \Gamma(k) + \frac{\beta(k) \cdot \Gamma(k) \cdot \xi(k) \cdot \xi(k)^T \cdot \Gamma(k)}{1 + \xi(k)^T \cdot \Gamma(k) \cdot \xi(k)} \quad (25)$$

$$\epsilon(k) = \eta(k) - \hat{\eta}(k) \quad (26)$$

where $\Gamma(0) = \Gamma(0)^T > 0$, $0 \leq \beta(k) < 2$

Thus, it can be seen that the off-set $\Delta\psi$ arising at the yaw rate sensor 2 can be obtained accurately by using the above described parameter identification method.

It is to be noted that the steering angle in the above embodiment can be detected by using a steering angle sensor for detecting a value of a steering angle for a steering wheel of the automobile as described above, or alternatively by using a steering angle sensor for detecting a value of a steering angle for front wheels of the automobile.

It is also to be noted that although the above embodiment has been described for a case of applying the off-set removing apparatus of the present invention to a brake control system in a car, the present invention is also applicable to a four wheel steering car using a yaw angular velocity feedback by taking the rear wheel steering angle into consideration in the equation of motion (1) described above.

Moreover, the present invention can also be applied to a traction control system or a hydraulic active suspension control system, in which an off-set $\Delta Y_G$ arising at the lateral acceleration sensor can be removed by using the output equation for the lateral acceleration, in the manner similar to the embodiment described above.

Besides this, many modifications and variations of the above embodiments may be made without departing from the novel and advantageous features of the present invention. Accordingly, all such modifications and variations are intended to be included within the scope of the appended claims.

What is claimed is:

1. An apparatus to control a dynamic characteristic of an automobile using off-set removed physical quantities, comprising:

a plurality of physical quantity detection means, each one for detecting a value of a different one of a plurality of physical quantities which are mutually related through an identical differential equation of motion;

off-set calculation means for calculating, in a prescribed state in which a value of one of the physical quantities detected by one detection means is known to take an accurate value, off-sets of values of remaining physical quantities obtained by remaining detection means, by using a parameter identification method for the remaining physical quantities, in accordance with the identical differential equation of motion into which a value of said one of the physical quantities detected by said one detection means is substituted;

off-set removal means for removing the off-sets calculated by the off-set calculation means from values of said remaining physical quantities obtained by said remaining detection means to obtain the off-set removed physical quantities; and a controller to control the dynamic characteristic of the automobile according to the off-set removed physical quantities obtained by the off-set removal means.

2. The apparatus of claim 1, wherein the prescribed state is a state in which said one of the physical quantities is known to take a value equal to zero.

3. The apparatus of claim 1, wherein said one of the detection means is state detection means for detecting a state of a system to be controlled, and said remaining detection means are input detection means for detecting values of system inputs representing a dynamic characteristic of the system to be controlled.

4. The apparatus of claim 3, further comprising means for updating system parameters expressing the state of the system to be controlled according to the calculated off-set.

5. An apparatus to control a dynamic characteristic of an automobile using off-set removed physical quantities, comprising:

input detection means for detecting a value of a system input representing a dynamic characteristic of the automobile;

state detection means for detecting a state of the automobile;

off-set calculation means for calculating, in a prescribed state of the automobile detected by the state detection means, an off-set of the system input obtained by the input detection means, by using a parameter identification method for the system input, in accordance with an identical differential equation of motion through which the state of the automobile and the system input are related and into which the state detected by the state detection means is substituted, and for updating system parameters expressing the state of the automobile according to the calculated off-set;

off-set removal means for removing the off-set calculated by the off-set calculation means from the system input obtained by the input detection means to obtain the off-set removed physical quantities; and a controller to control the dynamic characteristic of the automobile according to the off-set removed physical quantities obtained by the off-set removal means.

6. The apparatus of claim 5, wherein the prescribed state is a state in which the state of the automobile detected by the state detection means is known to take a value equal to zero.

7. The apparatus of claim 5, wherein the state of the automobile is expressed in terms of planar motion car model having two degrees of freedom.

8. The apparatus of claim 5, wherein the input detection means is a steering angle sensor means for detecting a value of a steering angle for a steering wheel of the automobile.

9. The apparatus of claim 5, wherein the input detection means is a steering angle sensor means for detecting a value of a steering angle for front wheels of the automobile.

10. The apparatus of claim 5, wherein the state detection means is a sensor means for detecting a state of at least one component of a planar motion of the automobile.

11. The apparatus of claim 10, wherein the state detection means is a yaw rate sensor means for detecting a yaw rate of the automobile.

12. The apparatus of claim 5, wherein the prescribed state is a state in which the automobile is running straight.

* * * * *